MAGNETIC THIN FILM PARAMETRON

Filed May 7, 1964 2 Sheets-Sheet 1

INVENTOR.
WILMER S. POWELL
BY Francis A. Varallo
AGENT

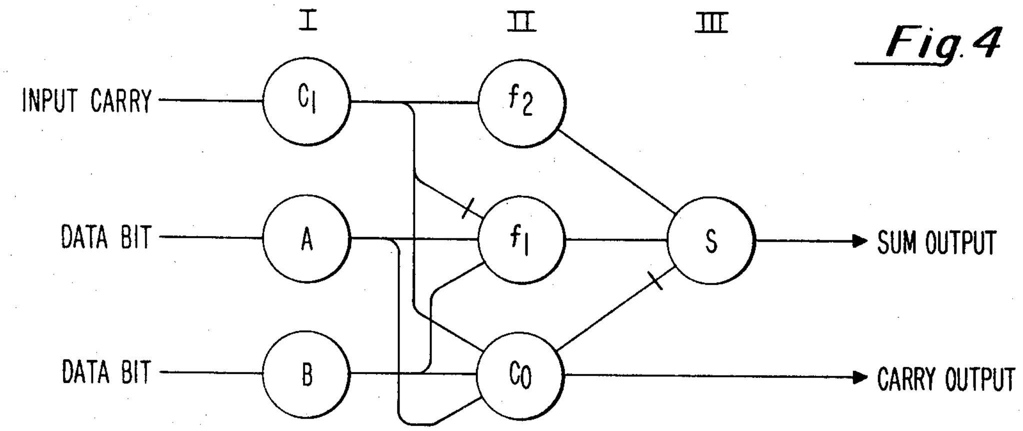
Fig. 4
| INPUTS | | | FUNCTIONS | | | | |
|---|---|---|---|---|---|---|---|
| A | B | C1 | f1 | f2 | C0 | $\overline{C_0}$ | S |
| 0 | 0 | 0 | 0 | 0 | 0 | 1 | 0 |
| 0 | 1 | 0 | 1 | 0 | 0 | 1 | 1 |
| 1 | 0 | 0 | 1 | 0 | 0 | 1 | 1 |
| 1 | 1 | 0 | 1 | 0 | 1 | 0 | 0 |
| 0 | 0 | 1 | 0 | 1 | 0 | 1 | 1 |
| 0 | 1 | 1 | 0 | 1 | 1 | 0 | 0 |
| 1 | 0 | 1 | 0 | 1 | 1 | 0 | 0 |
| 1 | 1 | 1 | 1 | 1 | 1 | 0 | 1 |
Fig. 5
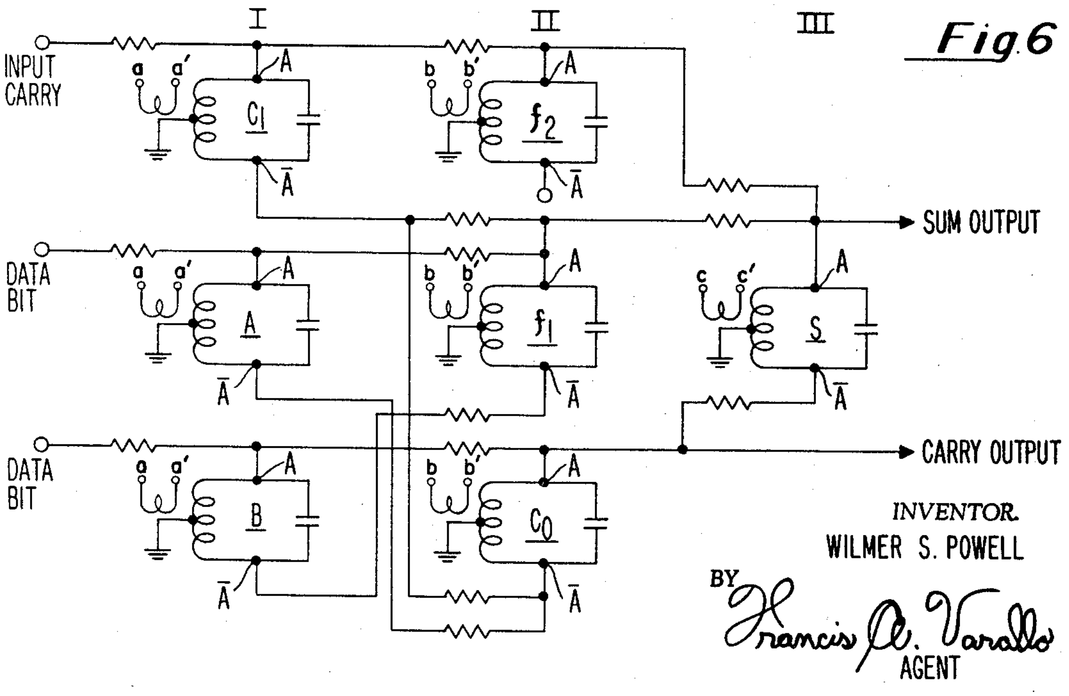
Fig. 6
INVENTOR.
WILMER S. POWELL
BY Francis A. Varallo
AGENT 3,395,289
MAGNETIC THIN FILM PARAMETRON
Wilmer S. Powell, Paoli, Pa., assignor to Burroughs Corporation, Detroit, Mich., a corporation of Michigan
Filed May 7, 1964, Ser. No. 365,657
10 Claims. (Cl. 307—88)

ABSTRACT OF THE DISCLOSURE

The present disclosure describes a parametron configuration in which the parametron resonant circuit includes a thin film of ferromagnetic material, said film being enclosed within a center-tapped coil—the resonant circuit being completed by a capacitor connected across the outer terminals of the coil. This configuration allows the mechanization of majority logic by means of resistive coupling among the parametrons of a system and additionally, provides a convenient method of logical inversion.

The present invention relates generally to parametrically excited resonant devices, often referred to as parametrons, and specifically to the class of parametrons which utilize thin magnetic films as the variable inductance component of the parametron resonant circuit. More specifically, the invention relates to a novel coupling scheme for such magnetic thin film parametrons employed as logical elements.

The principles of parametron operation are presently well known to those skilled in the art and are described in detail in a publication authorized by Eiichi Goto entitled "The Parametron, A Digital Computing Element which Utilizes Parametric Oscillations," and appearing in the Proceedings of the IRE, vol. 47, No. 8, August 1959. A further description of parametron devices and systems is found in U.S. Patent No. 2,948,818, issued Aug. 9, 1960 in the name of Eiichi Goto.

Briefly, the basic parametron comprises a resonant circuit including a parallel inductance and capacitance, tuned by appropriate wiring and selection of components to a desired frequency. One of the circuit components, either the inductance or the capacitance, is nonlinearly variable. When an excitation current alternating at a radio frequency (R.F.) twice that of the tuned resonant frequency of the parametron together with a D.C. bias current are applied to the variable component, the reactance of this component is pumped or varied with the excitation, causing the parametron to oscillate at half the frequency of the excitation current.

The parametron is thus a phase-locked subharmonic oscillator in which the relative phase angle of the oscillation, either 0° or 180°, is employed to represent the binary information "1" or "0." The phase of the oscillation can be selected by the application of a small control or information-input signal to the resonant circuit in the early stages of its oscillation. Such an input signal produces a small initial oscillation in the parametron which serves as a "seed" or nucleus for determining the phase state of the parametron when it is in the active or excited condition.

The biphase subharmonic oscillation of parametrons allows the use of combinations of such devices to perform data storage and processing functions. In such operation, the parametrons are often connected in cascade, with the output signal of one parametron serving as the control input signal of the next parametron. Since the parametron is a two-terminal device, unilateral information flow is generally based upon a three-phase clock cycle, also referred to as three-beat excitation. Thus, each of the parametrons will be excited once in every clock cycle, at a definite time. In a system employing parametrons, the elements are arranged in three groups, I, II, III, corresponding respectively to the phases of the clock cycle. All of the parametrons in the first group (I) are simultaneously excited into oscillation by the alternating pump current excitation of the first clock phase; the second group (II), during the second phase; the third group (III), during the third phase. The excitation periods of the three clock phases are chosen to overlap one another to permit the transfer of information between parametrons of "adjacent" groups such as from Group I to Group II, Group II to Group III, Group III to Group I. During a given clock period, a particular parametron is either receiving information, transmitting information, or is inactive, that is not oscillating. Information is transferred by influencing an inactive parametron with a low-amplitude signal of frequency, $f$, which may be a portion of the oscillation current from one or more active donor parametrons belonging to the preceding phase group. Following receipt of this small "seed" signal, the A.C. pump excitation current of frequency $2f$ initiates oscillation in the receiver parametron. The phase state of this oscillation is the same as, and is determined by, the input phase from the donor parametron and the oscillation continues in this state until the excitation current is terminated. Thus one parametron element may be controlled by the oscillation of another, and information may be readily transferred from element to element. Basic logic functions such as AND and OR, together with more complex functions may be simply mechanized by parametrons operating in a majority mode. Thus, the majority phase of an odd number of inputs from donor parametrons will determine the resultant phase of the receiving parametron.

In accordance with a preferred embodiment of the prseent invention, a planar thin film or layer of ferromagnetic material having a uniaxial anisotropy or preferred axis or direction of magnetization is employed as the nonlinear variable inductor component of the resonant circuit. The magnetic film is enclosed within a center-tapped winding or coil having its axis oriented transverse to said preferred axis, and adapted to apply a transverse field to the film. A fixed capacitor connected in parallel across said latter coil completes the resonant circuit. The magnetic properties of the thin film provide an excellent means of achieving the necessary $2f$ variation of inductance without coupling this latter frequency into the resonant circuit which contains the information frequency $f$.

Additional noteworthy features of utilizing thin magnetic films in parametrons stem from the high speed potential of thin films and the possibility of automatic fabrication of parametrons by means of vacuum deposition and sputtering techniques. Ferrite cores of the type described in the referenced art, as well as tape-wound cores, present frequency limitations because of hysteresis losses and eddy currents. Moreover, at least two cores per parametron or an equivalent multiaperture structure is required to decouple the $2f$ frequency, which results in a rather cumbersome winding configuration.

A specific advantage of the present invention is the ease of mechanization of majority logic by means of resistive coupling, together with the convenience and economy of logical inversion without the need for separate phase inverting transformers.

It is therefore a general object of the present invention to provide an improved configuration for a parametron element.

Another object of the present invention is to provide an improved system for operating a plurality of parametrons.

A specific object of the present invention is to provide a system comprised of a plurality of magnetic thin film parametrons employed as universal logic elements.

These and other features of the invention will become more fully apparent from the following description of the annexed drawings, wherein:

FIG. 4 depicts a logic diagram for a full-adder circuit utilizing parametron elements;

FIG. 5 is a truth table showing the phase state of the parametrons of FIG. 4, with various combinations of input signals;

FIG. 6 is a schematic diagram of a binary full-adder employing the thin film parametrons of FIG. 1, which corresponds directly to the logic diagram of FIG. 4 and operates in accordance with the table of FIG. 5.

Figure 1:
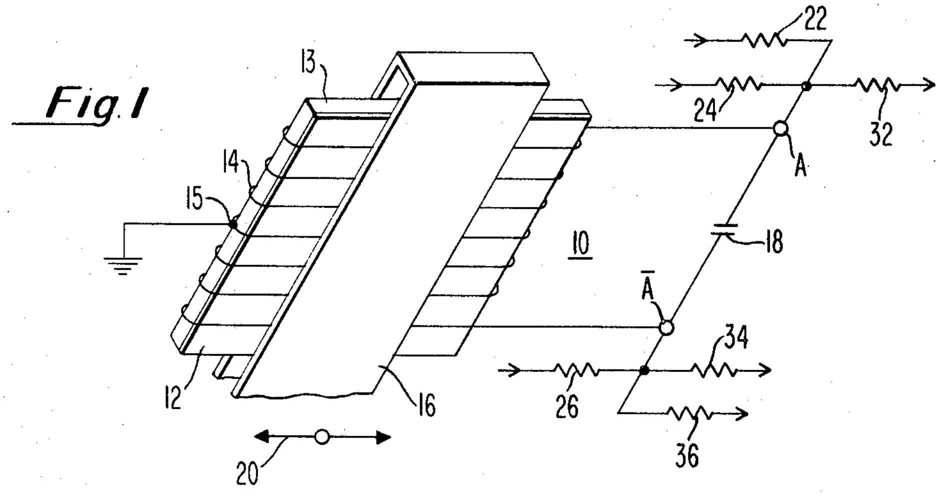
FIG. 1 is a pictorial representation of a thin film parametron including a typical arrangement of winding associated therewith.

Referring to FIG. 1 there is represented a single unit of a thin film parametron element designated 10, including the associated windings and coupling resistors needed to permit its employment in data processing and computing devices. In FIG. 1 the ferromagnetic film is depicted as being rectangular in form and is identified by reference numeral 12. In practice the actual geometric form of the element may be other than rectangular, and the invention should not be considered so limited. The windings or portions of windings which are intended to affect the magnetization of the film element 12 are situated in a plane parallel to the film and in close proximity thereto. The preferred direction of magnetization of the film 22 is indicated by the arrows 20 and lies within the plane of the paper. The center-tapped winding 14 which is part of the resonant circuit and is sometimes referred to as the tank coil, has its coil axis oriented transverse to the preferred axis and current flow therethrough will apply a transverse field to the element 12. The tap 15 is connected to a reference potential. Conductor 16, the pump or excitation winding, is located perpendicular to the preferred direction of magnetization and is adapted to provide a magnetizing field to the element 12 along the preferred direction. A base 13 serves as a support for the film and windings.

The capacitor 18 is connected in parallel across the extremities or outer terminals of the variable inductor, comprised of winding 14 and thin film element 12. In practice, the LC resonant circuit is tuned to resonance at a frequency $f$. Input resistors 22, 24 and 26 serve to couple the oscillations from three active parametrons of the preceding group into the resonant circuit of parametron 10.

On the other hand, resistors 32, 34 and 36 are output resistors which couple the oscillation output of parametron 10 to three other parametrons respectively of the succeeding group. Thus in a system of parametrons, if parametron 10 is a member of Group II, and assuming three-beat excitation, the input resistors 22, 24 and 26 of parametron 10 would be coupled respectively to parametrons of Group I, and the output resistors 32, 34 and 36, to parametrons of Group III.

In an actual operative embodiment, the parametron inductor consisted of 12 turns of No. 44 wire wound on a ⅛ inch square magnetic thin film. The film thickness was 5000 A., and was made by vacuum deposition on 6-mil glass strips. The coercivity $H_c$ of the magnetic material was approximately 1.0 oersted; the anisotropy field $H_k$, about 2.0 oersteds. The 12 turns of wire comprising the tank coil were spaced across the film. This configuration allowed a lower inductance than would a tightly wound coil, and in turn allowed the tank capacitor to have a value of 100 pf. which is reasonably large compared to stray wiring capacitance.

The frequency of the R.F. pump current, was chosen at 50 mc. The peak pump current for reliable operation was 2.0 amperes, applying an effective field of 5.32 oersteds peak. The bias current component of the excitation current was 1 ampere, giving a field of 2.66 oersteds. The pump winding carrying the excitation current was approximately 1/16 inch wide. It should be emphasized that the foregoing dimensions and amplitudes given for the embodiment described, may vary according to the material, design or application, and are included solely for purpose of example.

The parametron element 10 is a convenient and efficient logical building block. Parametron logic requires a means of coupling a small part of the output of several donor parametrons into a receiving parametron. In the present example, the phase of the net signal input will be that of the majority of the transmitting parametrons connected respectively to resistors 22, 24 and 26 and this net signal determines the phase of oscillations in the receiving parametron 10. With the prior art ferrite core parametrons, transformers were used for coupling and provided, in addition, a means of logical inversion of signals. The planar thin film parametron in accordance with the present invention, eliminates the winding complexity inherent in the use of coupling transformers.

A highly significant feature of the invention is that logical inversion or the NOT function, is achieved with a grounded center-tap 15 on the inductor winding 14. The oscillations in the resonant circuit are therefore 180 degrees out of phase on the respective outer terminals of the winding 14. This center tap connection is usually made to a ground plane which serves as a return path for all of the input signals, supplied by the resistors on either side of the inductor. Thus as indicated in FIG. 1 an output signal A and its complement, $\overline{A}$ ("not A") are available from respective sides of the resonant circuit. With respect to a plurality of interconnected parametrons, inverting connections are made for the A output of a donor parametron to an $\overline{A}$ input of a receiving parametron or vice versa. Non-inverting connections are made from A output terminal of the donor, to the A input terminal of the receiver, or from the $\overline{A}$ output terminal, to the $\overline{A}$ input terminal. In this last case, a double inversion or negation takes place, so that the net effect is the same as that for a connection from A output to A input. It should be apparent that since the parametron is a two-terminal device, the input and output terminals are the same. The usefulness of the center-tap configuration of the resonant circuit coil will become even more obvious when the wiring for a binary adder is considered hereinafter.

In the design of a parametron system, if it is assumed that each of the input resistors have a value of impedance, $R_t$, the parametron resonant circuit is loaded with an equivalent resistance $R_L$ which may be computed as:

$$R_L = \frac{4R_t}{m+n} \qquad (1)$$

where $m$ and $n$ are the numbers of inputs and outputs respectively. With this load impedance, the design requirement is to have the parametron oscillation reach full amplitude of proper phase within one-third of a clock period, while a "worst-case" input signal is applied thereto. This last input signal is some fraction, X, of a unit input $V/R_t$, where V is the nominal steady state amplitude. The fraction X is given by:

$$X = \left(\frac{m+1}{2}\right)\left(\frac{1-\xi}{1+\rho}\right) - \left(\frac{m-1}{2}\right)\left(\frac{1+\xi}{1-\rho}\right) \qquad (2)$$

where $m$ is the number of inputs, $\xi$ is the tolerance on V, and $\rho$ is the resistance tolerance.

In a particular operating embodiment of the present invention in which the pump excitation frequency was 50 mc., the above equations allowed the use of five inputs with $\xi = \rho = 0.05$, and $R_t = 1500$ ohms. The nominal steady-state voltage V is 1.5 volts peak, from the center tap to either side of the inductor.

Figure 2:
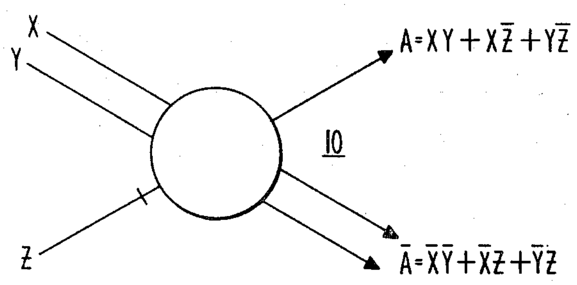
FIG. 2 is a logic diagram of the thin film parametron of FIG. 1, employed as a majority gate in accordance with the present invention.

FIG. 2 depicts the parametron of FIG. 1 in logical form. Thus, the circle represents the parametron 10 employed as a majority gate, which provides for example a "1" output if a majority of the inputs are "1's". Only an odd number of inputs are allowed. In FIG. 2, the latter are designated X, Y and Z and correspond respectively to the inputs coupled to parametron 10 by resistors 22, 24 and 26 of FIG. 1. The short bar across line Z denotes inversion, that is, the donor parametron (not shown) and the receiving parametron 10 are coupled in a manner to effect negation of the signal being transmitted.

The output of the gate from the A terminal appearing at output resistor 32 in FIG. 1 is expressed in terms of the conventional AND and OR connectives by forming the sum of the products of all possible pairs of inputs. Thus, $$A=XY+X\bar{Z}+Y\bar{Z}$$

The complement of this output, appearing at the $\bar{A}$ terminal and available at resistors 34 and 36 in FIG. 1, is represented by the original output at A with each literal replaced by its complement, that is, $$\bar{A}=\bar{X}\bar{Y}+\bar{X}Z+\bar{Y}Z$$

Figure 3:
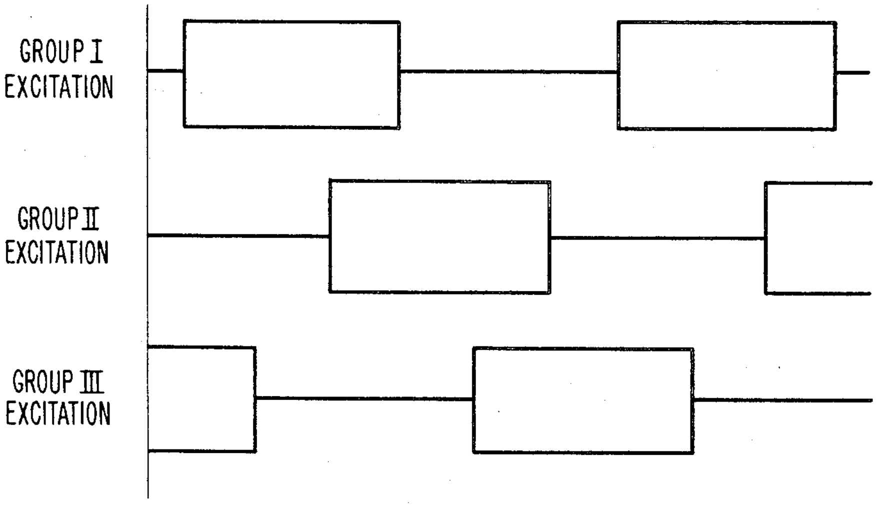
FIG. 3 is a timing diagram for the three-phase excitation generally employed in parametron systems.

FIG. 3 illustrates the timing required for the excitation of groups of parametrons employed as logical elements. Any parametron in the system must be assigned to one of the three-phase Groups, I, II or III, before a logical function may be realized. Each group is characterized by a periodic excitation which lags the previous group by one-third of a clock period as represented by the rectangular blocks in FIG. 3. In this manner, a parametron begins oscillation in the presence of an input from the previous group, as mentioned hereinbefore in connection with FIG. 1.

FIGS. 4 to 6 inclusive serve to emphasize the utility and convenience of the parametron element of FIG. 1 as a logical building block in the construction of a binary adder.

FIG. 4 illustrates the logic schematic of the adder, which also appears in the referenced publication. Seven parametrons are depicted; the three designated A, B and $C_1$ comprise Group I; $f_1$, $f_2$ and $C_0$, Group II; and S, Group III. Parametrons A and B receive the binary input information to be added and $C_1$, the carry information from the next lower order.

The carry output is generated in a three-input majority gate, $C_0$ and the sum appears as the output of parametron S. Parametron $f_2$ serves to delay the carry information being transmitted by $C_1$ to S in order that it may be applied to S concurrently with the outputs from parametrons $f_1$ and $C_0$.

The table of FIG. 5 depicts the various combinations of input signals which may be applied to parametrons A, B and $C_1$ of FIG. 4. Further, the table sets forth the phase state of each of the other parametrons for each set of input information. For example, consider the carry output parametron $C_0$ when the data bits and input carry to be added are $A=1$, $B=0$ and $C_1=1$. During the excitation phase for Group I, parametrons A and $C_1$ oscillate in the same phase, which arbitrarily may be at a 0° phase angle with respect to the AC pump signal. The oscillations of parametron B are 180° out of phase with those of A and $C_1$. The oscillation signals for these parametrons are coupled to parametron $C_0$. Since there are two 0° phase angle signals and only one 180° phase angle signal, the nucleus oscillation in the resonant circuit of $C_0$ will also be of the 0° phase which may represent a binary "1." When the Group II parametrons are excited, $C_0$ will oscillate as though it were storing a binary "1." In similar fashion, considering the same input data, parametron $f_1$ will receive a binary "1" from A, and binary "0" signal inputs from B and $C_1$. Note that the output from $C_1$ has been inverted in the coupling to $f_1$. Parametron $f_1$, when active, will oscillate in the binary "0" state. The sum parametron S, during the excitation of the Group II elements, will receive a binary "1" input from parametron $f_2$, and binary "0" inputs from parametrons $f_1$ and $C_0$ respectively. The last input represents $\bar{C}_0$ as required by the logic diagram. The energization of S as a Group III element, will produce a sum output oscillation representative of binary "0."

The schematic diagram of FIG. 6 illustrates the actual wiring of the parametron elements of FIG. 4. Like designations have been used to identify the various elements. In each case coupling resistors, the center-tapped tank coil and capacitor have been shown. The excitation windings, each corresponding to winding 16 of FIG. 1, are illustrated schematically. Excitation windings for the parametrons in Groups I, II and III are designated respectively *a*, *a'*, *b*, *b'* and *c*, *c'* and it is assumed that these windings will be energized in a manner to activate each of the groups as illustrated in FIG. 3.

As mentioned previously in connection with FIG. 1, but now illustrated more clearly in FIG. 6, connections between parametrons made from an upper terminal of the donor (A terminal) to the lower terminal of the receiver ($\bar{A}$ terminal) or from the lower to the upper, effect logical inversion or negation. Connections between homologous terminals, that is upper terminals of two parametrons or between lower terminals of parametrons, cause no inversion of the oscillation signals. Note that the logic diagram of FIG. 4 requires an inversion in the input to $f_1$ from $C_1$. To implement this the lower terminal $\bar{A}$ of $C_1$ is coupled by way of a resistor to the upper terminal A of $f_1$. Likewise, as required by the logic, the ouput of $C_0$ which is applied to S is inverted by a connection between the upper terminal A of $C_0$ and the lower terminal $\bar{A}$ of S. Thus, connections between opposite terminals of the parametrons effect logical inversion.

As examples of non-negating connections, the inputs to $C_0$ from A and B respectively should be noted. The input to $C_0$ from parametron A leaves the $\bar{A}$ terminal of A and enters the $\bar{A}$ terminal of parametron $C_0$. The input to $C_0$ from parametron B on the other hand leaves the A terminal of B and enters the A terminal of parametron $C_0$.

In view of the alternate connections possible between elements for either the direct or inverse transfer of signals, as provided by the present invention, the parametron system may be designed so as to substantially balance the load imposed on both sections of the center-tapped inductor. This feature is of importance in large systems where maximum numbers of fan-in and fan-out coupling impedances are required.

It is apparent from the foregoing considerations that the mechanization of a logic function is readily accomplished with the magnetic thin film parametrons of the present invention. It should be understood that modifications of the arrangements described herein may be required to fit particular operating requirements. These will be apparent to those skilled in the art. The invention is not considered limited to the embodiments chosen for purpose of disclosure and covers all changes and modifications which do not constitute departures from the true spirit and scope of this invention. Accordingly, all such variations as are in accord with the principles discussed previously are meant to fall within the scope of the appended claims.

What is claimed is:

1. A parametron comprising a resonant circuit containing a variable inductor, said inductor comprising a center-tapped coil wound about and inductively coupled to a magnetic element, excitation means coupled to said inductor and operable upon energization to cause parametric oscillations to be generated in said resonant circuit, a capacitor connected in parallel across the extremities of said coil, the center-tap of said coil being connected to ground potential, means for applying at least one input signal to a selected extremity of said coil and means for supplying at least one output signal from a selected extremity of said coil.

2. A parametron as defined in claim 1, wherein said magnetic element is a planar thin film of ferromagnetic alloy having a preferred direction of magnetization and a thickness of not more than 10,000 angstrom units.

3. A parametron comprising a resonant circuit containing a variable inductance component, said inductance component including a layer of ferromagnetic material having a uniaxial anisotropy and winding means inductively coupled to said layer, excitation means coupled to said inductance component and adapted to be energized from a power source whereby oscillations of substantially the resonant frequency of said resonant circuit are generated in said circuit, said winding means having a plurality of terminals including a pair of outer terminals at its extremities and an intermediate terminal, a capacitive element connected in parallel across said outer terminals of said winding means, said intermediate terminal of said winding means being connected to a reference potential, and impedance means connected to said outer terminals of said winding means for applying signals to said resonant circuit and supplying signals therefrom.

4. A parametron comprising a resonant circuit containing a variable inductance, said inductance comprising a center-tapped coil wound in inductive coupling relation about a planar thin magnetic film element, said thin film element having a preferred direction of magnetization, said coil having its axis oriented perpendicular to said preferred direction of magnetization of said element whereby current flow through said coil generates a magnetizing field directed transverse to said preferred direction, an excitation winding coupled to said inductance and positioned with respect to said preferred direction of magnetization so as to provide upon energization a mangetizing field directed parallel to said preferred direction, a capacitor connected in parallel across the extremities of said coil, the center tap of said coil being connected to reference potential, means for applying input information signals selectively to either extremity of said coil and means for supplying output signals selectively from either side of said coil.

5. A parametron comprising a resonant circuit containing a variable inductance, said variable inductance including a planar thin magnetic film element having a preferred axis of magnetization and the tank winding inductively coupled to said magnetic film element, excitation winding means coupled to said inductance and adapted to be energized from a source providing an AC pump current of twice the frequency of said resonant circuit and a DC bias current, said resonant circuit generating oscillations of substantially the resonant frequency thereof in response to the energization of said excitation winding means, said tank winding means having at least a pair of outer terminals and a terminal intermediate said outer terminals, a capacitor connected across said outer terminals of said tank winding, the intermediate terminal of said tank winding being connected to a reference potential, separate first impedance means connected to selected ones of said outer terminals of said tank winding for applying input information signals of substantially said resonant frequency and of predetermined phase to said resonant circuit, and separate second impedance means connected to selective ones of said outer terminals of said tank winding for supplying output signals derived from the oscillations of said resonant circuit and being a function of the phase of said input signals.

6. A parametron comprising a resonant circuit containing a variable inductance, said inductance including a magnetic film element having a preferred axis of magnetization and a tank coil wound in close proximity to said element and inductively coupled thereto, excitation winding means coupled to said inductance and adapted to be energized from a source of excitation power including an AC component of current having a frequency twice that of the nominal resonant frequency of said resonant circuit, said resonant circuit, generating parametric oscillations of said nominal resonant frequency in response to the energization of said excitation winding means, said parametric oscillations being stable in either of two different phase angles with respect to the phase of said AC component of current, said tank coil having at least a pair of outer terminals and an intermediate terminal, a capacitor connected across said outer terminals of said tank coil, the intermediate terminal of said tank coil being connected to ground potential, the parametric oscillations generated in said resonant circuit appearing at said outer terminals of said tank coil and being of opposite phase with respect to each other, a plurality of input impedances connected to selected ones of said outer terminals of said tank coil for coupling information input signals to said resonant circuit, said input signals being of the same nominal resonant frequency, but each having a predetermined phase in accordance with the information it represents, the phase of the parametric oscillations of said resonant circuit being determined by the phase of the majority of information signals coupled thereto, a plurality of output impedances connected to selected ones of said outer terminals of said tank coil for supplying output signals having a desired phase and being derived from the parametric oscillations of said resonant circuit.

7. A parametron as defined in claim 6 characterized in that said pluralities of input and output impedances are resistances.

8. A parametric system comprising a plurality of parametrons arranged in groups to perform a logical function, each of said parametrons having a resonant circuit containing a variable inductance, said inductance comprising a magnetic element having a preferred axis of magnetization and a coil wound in close proximity to said element and inductively coupled thereto, an excitation winding coupled to said inductance and adapted to be energized from a source of electrical power including an AC component of current having a frequency twice that of the nominal resonant frequency of said resonant circuit, said resonant circuit generating parametric oscillations of said nominal resonant frequency in response to the energization of said excitation winding, said parametric oscillations being stable in either of two different phase angles with respect to the phase of said AC component of current, said coil having at least a pair of outer terminals and an intermediate terminal, a capacitor connected across said outer terminals of said coil, the intermediate terminal of said coil being connected to a reference potential, the parametric oscillations generated in said resonant circuit appearing at said outer terminals of said coil and being of opposite phase with respect to each other, a plurality of resistors conecting respectively selected ones of said outer terminals of the tank coils of a first group of parametrons acting as donors with selected ones of said outer terminals of the tank coils of a succeeding group of parametrons acting as receivers, the connections being made in accordance with the logical functions to be performed, a conection between homologous terminals of the respective coils of donor and receiver parametrons producing no inversion in the phase of the parametric oscillation signal being transferred therebetween, a connection between opposite terminals of the respective coils of donor and receiver parametrons producing a logical inversion of said oscillation signal.

9. A system as defined in claim 8, wherein said magnetic element is a planar thin film of ferromagnetic alloy having a nominal thickness of 5,000 angstrom units.

10. A system as defined in claim 8 characterized in that said coil and said excitation winding are positioned with respect to said preferred axis of magnetization such that currents flowing therethrough will generate respectively magnetizing fields transverse to and parallel with said preferred axis of magnetization.

References Cited

UNITED STATES PATENTS

| | | | |
|---|---|---|---|
| 3,275,839 | 9/1966 | Bartik | 307—88 |
| 3,292,001 | 12/1966 | Constantine | 307—88 |

FOREIGN PATENTS

| | | |
|---|---|---|
| 921,850 | 3/1963 | Great Britain. |

OTHER REFERENCES

Terada, Hiroshi, "The Parametron—An Amplifying Logic Element," Control Engineering, Apr. 4, 1959, pp. 110–115.

Schauer, R. F. et al., "Some Applicantions of Magnetic Film Parametrons as Logic Devices," IRE Transactions on Electronic Computers, September 1960, pp. 315–320.

STANLEY M. URYNOWICZ, Jr., *Primary Examiner.*